United States Patent
Linder et al.

[11] 4,054,485
[45] Oct. 18, 1977

[54] THIN FILM APPARATUS

[75] Inventors: Heinz Linder, Zofingen; Hans Gruter, Zurich, both of Switzerland

[73] Assignee: Luwa AG, Zurich, Switzerland

[21] Appl. No.: 620,155

[22] Filed: Oct. 6, 1975

[30] Foreign Application Priority Data

Oct. 9, 1974  Switzerland .............. 13538/74

[51] Int. Cl.² .............................................. B01D 1/22
[52] U.S. Cl. .................................. 159/6 W; 159/13 A; 202/236
[58] Field of Search ............ 159/6 W, 6 R, 49, 13 A, 159/6 WH; 55/185, 188, 200, 201, 400; 202/236

[56] References Cited

U.S. PATENT DOCUMENTS

| 3,017,289 | 1/1962 | Miller et al. | 159/6 W |
| 3,082,815 | 3/1963 | Keller | 159/6 W |
| 3,234,993 | 2/1966 | Belcher | 159/6 W |
| 3,633,645 | 1/1972 | Gorbeit | 159/6 W |

FOREIGN PATENT DOCUMENTS

| 1,019,642 | 11/1957 | Germany | 159/6 W |

Primary Examiner—Bernard Nozick
Attorney, Agent, or Firm—Werner W. Kleeman

[57] ABSTRACT

A thin film apparatus for the treatment of flowable materials comprising a rotor arranged within a substantially rotationally symmetrical housing having a section constituting a treatment portion for the material or feed to be processed and a section constituting a separation or separator portion, the inner diameter of which is larger than that of the treatment portion. The section defining the separator portion is connected via a transition element or member having a substantially conical inner surface with the section defining the treatment portion. An inlet stud or connection for the material to be treated opens into the housing at the location of the inner surface of the transition member where a diameter of the aforementioned inner surface is greater than the internal diameter of a treatment chamber or compartment of the treatment portion. The rotor or rotor means is provided with approximately axially extending vanes at least within the treatment portion. At the height or elevation of the inner surface of the transition member the rotor carries a collar equipped with conveyor elements, this collar merging with a distributor ring arrangement operatively associated with the inlet connection.

13 Claims, 3 Drawing Figures

4,054,485

THIN FILM APPARATUS

BACKGROUND OF THE INVENTION

The present invention relates to a new and improved construction of thin film apparatus for the treatment of flowable materials.

When working with thin film apparatuses one of the functions which should be carried out is to distribute the infed material or feed to be treated within a short axial distance or path in such a manner that the treatment surface is also uniformly impinged or contacted over its periphery already at the portion thereof located at the neighborhood of the feed inlet. If this function is not complied with, then it should be recognized that a part of the structural height of the equipment intended for the treatment operation is not utilized, or in a less effective manner.

Attainment of the previously mentioned objective is particularly difficult in the case of so-called large size equipment, typically possessing a diameter of 800 millimeters or more, and up to the present, as far as applicants are aware, has not been possible in a satisfactory manner. It is known to the art to supply the feed or material to be treated into the equipment with the aid of a multiplicity of inlet studs or connections uniformly distributed about the circumference of the housing. Material distribution within the confines of the equipment or apparatus is thus facilitated. However, such constructional manifestation of thin film apparatus, apart from the increased costs in manufacturing the same, also is associated with an extremely great expenditure during installation of the apparatus in order to be able to connect all of the inlet studs or connections via distributor lines or conduits in such a manner that during operation of the system such will be uniformly supplied with the feed or material to be treated.

SUMMARY OF THE INVENTION

Hence, with the foregoing in mind it is a primary object of the present invention to provide a new and improved construction of thin film apparatus which is not associated with the aforementioned drawbacks and limitations of the prior art proposals.

A further specific object of this invention aims at the provision of a new and improved construction of thin film apparatus wherein the structural height of the apparatus is essentially completely utilized and there can be avoided an additional expenditure for installation of the apparatus.

Still a further significant object of the present invention contemplates a thin film apparatus constructed in a manner permitting the most efficacious use of the structural height thereof to maximize the treatment operation and, which apparatus, is relatively simple in construction and design, economical to manufacture and install, and requires a minimum of maintenance and servicing.

The invention is basically predicated upon the recognition that the inner surface of a conical transition element can be then beneficially employed for the distribution of the feed or material to be treated if there is arranged, as a counter element upon the rotor, a means or elements which bring about the effect that the infed material impinges against this surface and is spread thereover.

Generally speaking, the thin film apparatus of the invention is of the type comprising a substantially rotationally symmetrical, typically vertically arranged, housing within which there is located a rotor or rotor means. The housing possesses a section constituting a treatment portion for the material or feed to be processed or treated and a section constituting a separation or separator portion, the inner diameter of which is larger than that of the treatment portion. The section defining the separator portion is operatively connected via a transition element or member having a substantially conical inner surface with the section defining the treatment portion. An inlet stud or connection for the material to be treated opens into the housing at the location of the inner surface of the transition member where a diameter or dimension of the aforementined inner surface is greater than the internal diameter or dimension of a treatment chamber or compartment of the treatment portion. The rotor or rotor means is provided with approximately axially extending vanes or equivalent structure at least within the treatment portion. Significant aspects of the invention contemplate that a collar or shroud provided with conveyor elements is connected or merges with a distributor ring arrangement operatively associated with the inlet connection at the height of the inner surface of the transition member or element.

While the material distribution function brings about that the infed material or feed impinges against the inner surface of the transition member at least in a coarsely divided state, under the influence of the force of gravity, the action of the centrifugal forces of the rotor vanes, and finally the conveyor elements operating in the direction of the treatment compartment, there occurs at such inner surface a uniform distribution and introduction of the material in a distributed state into the treatment compartment and upon the inner wall or surface thereof, respectively.

According to a preferred physical manifestation of the invention the material distributor ring arrangement, if desired in conjunction with the collar or shroud or equivalent structure, forms a part of an inner housing extending further into the separator portion and containing a rotating droplet separator. Moreover, the inner wall of such housing serves for the recycling or return of the droplets into the tretment portion.

Due to the arrangement of the distributor ring arrangement for the material in the separator portion of enlarged diameter there can be arranged within the inner housing a more effective rotatable separator possessing relatively large throughpassage cross-section or cross-sectional area.

No additional structural height is necessary for the improved material distribution provided that there can occur in the inner housing a separation of the droplets and externally thereof a material deposition and distribution at the same axial region or zone of the apparatus. On the other hand, the improved material distribution in any event permits of an enhanced utilization of the treatment surface at which there is formed and treated respectively, the thin film. This better utilization of the treatment surface, in turn, makes it possible to decrease in size the treatment surface, for instance by reducing the length of the treatment portion.

BRIEF DESCRIPTION OF THE DRAWINGS

The invention will be better understood and objects other than those set forth above, will become apparent when consideration is given to the following detailed description thereof. Such description makes reference to the annexed drawings wherein there have been illustrated two exemplary embodiments of thin film apparatus and wherein.

DETAILED DESCRIPTION OF THE INVENTION

Figure 1:
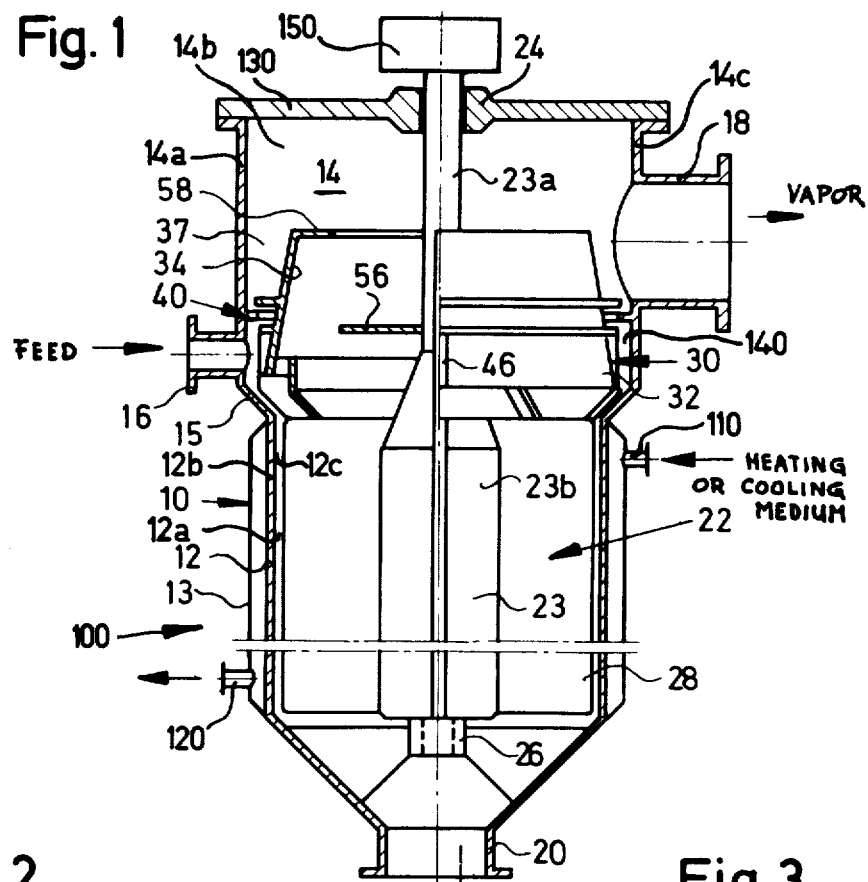
FIG. 1 is a longitudinal sectional view through a first exemplary embodiment of thin film apparatus constructed according to the teachings of the invention.
Figure 2:
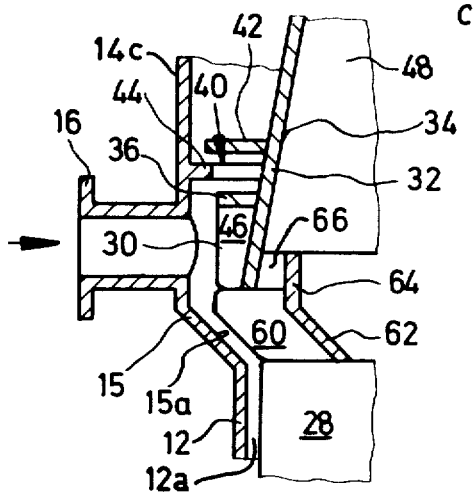
FIG. 2 is a fragmentary sectional view on an enlarged scale of a detail of the apparatus of FIG. 1.

Describing now the drawings, in the exemplary embodiment of thin film apparatus 100 shown by way of illustration and not limitation in FIGS. 1 and 2 the same is assumed to constitute a thin film evaporator possessing a vertically arranged housing, generally designated by reference character 10. This housing 10 forms a treatment portion 12 containing a treatment compartment 12a and defined by the housing portion 12b. Housing 12 further possesses a section 14a forming a separator portion 14 containing a separator compartment or chamber 14b. The separator portion 14 is arranged above the treatment portion 12. The treatment portion 12 will be seen to be operatively connected through the agency of a substantially conically widening or widened transition member or element 15 with the separator portion 14 possessing a larger diameter than that of the treatment portion 12. The term "diameter" has been used herein in a manner not intended to be limiting inasmuch as the same is related purely by way of Example, to a housing of typically circular cross-section. Obviously, if other cross-sectional shapes are used than the word "diameter" would be equatable to the relevant dimension of such modified apparatus shape.

At the end of the separator portion 14 confronting the treatment portion 12 there is arranged an inlet stud or connection 16 which immediately neighbors the transition member 15. This inlet stud or connection 16 serves for the infeed of the material or feed which is to be treated within the equipment. Moreover, a vapor outlet stud or connection 18 is secured at the wall 14c of the separator portion 14. At the lower end of the treatment portion 12 there is provided a substantially centrally arranged material outlet stud or connection 20 through which flows the condensate. Coaxially arranged within the housing 10 is a rotor or rotor means 22 having a rotor shaft 23 rotatably supported at its ends in the respective bearings 24 and 26, as best seen by referring to FIG. 1. This rotor 22 is provided with vanes 28 or equivalent structure which extend approximately over the entire length of the treatment portion 12 and the treatment compartment 12a. Also it will be seen that the treatment portion 12 is encased or surrounded by a heat exchange jacket 13 which can be heated or cooled through the action of an appropriate heating or cooling medium, as the case may be, which is infed for instance via the stud or connection 110 and withdrawn via the outlet stud or connection 120. Obviously the infeed and withdrawal of such heat exchange medium can be reversed, i.e. the stud 120 could be used for the infeed of the heating or cooling medium and the other stud or connection 110 for the discharge thereof.

Continuing, a material distributor ring arrangement, generally indicated by reference character 30, is positioned in the separator portion 14 at the height or elevation of the feed or material inlet connection 16. This distributor ring arrangement 30 is arranged at the rotor 22. Moreover, it will be seen from an inspection of FIG. 1 that the material distributor ring arrangement 30 is disposed at the outside of a substantially ring-shaped or annular inner housing 32 which tapers in the direction of the upper end of the separator portion 14 which is closed at its top by a suitable cover or cover member 130. At the outer circumference of the inner housing 32 there is arranged a so-called dam-up or baffle ring 36 directly above the inlet stud or connection 16. The wall 14c of the separator portion 14 together with the inner housing 32 forms an annular compartment or space 37, wherein the aid of a labyrinth seal or sealing arrangement 40 provided at the inner housing 32 in conjunction with the dam-up ring the ring-shaped compartment or annular compartment 37 is sealed in relation to the space 140 around the material distributor ring arrangement 30. The labyrinth seal 40 possesses a sealing disk 42 secured to the inner housing 32 and an annular or ring-shaped disk 44 fastened to the wall 14c of the separator portion 14 is operatively associated with the sealing disk 42.

The outer diameter of the dam-up or baffle ring 36 is dimensioned to be smaller in relation to the inner diameter of the ring-shaped disk 44 in such a manner that the inner housing 32 together with the material distributor ring arrangement 30 and the rotor means 22 can be retracted out of the separator portion 14. Attached at the inner housing 32 are distributor vanes 46 associated with the distributor ring arrangement or distributor ring 30, these vanes 46 merging or contacting at their upper ends the dam-up or baffle ring 36.

The inner housing 32 is secured by means of attachment ribs 48 or equivalent structure at the rotor means 22. The rotor shaft 23 will be seen to possesss a smaller diameter at the section or portion 23a thereof disposed at the region of the separator portion 14 and within the separator compartment 14b than the diameter of the rotor shaft portion 23b located within the treatment chamber or compartment 12a of the treatment portion 12. The inner housing 32 contains a droplet separator which in this instance is formed by two deflection disks or plates 56 and 58 arranged in superposed relationship and for which the inner side or surface 34 of the inner housing 32 functions as a droplet return or recycle surface.

At the end of the inner housing 32 confronting the treatment portion 12 and below the distributor vanes 46 there are arranged conveyor vanes 60 or equivalent structure which are attached at a conically constructed collar or shroud 62. The conveyor or conveying vanes 60 extend in the neighborhood of the conical inner surface 15a of the transition member or element 15. The collar 62 furthermore possesses a substantially cylindrically constructed deflection portion or component 64 which in conjunction with the inner housing 32 delimits a gap or space 66.

Having had the benefit of the foregoing description of the embodiment of thin film apparatus of the showing of FIGS. 1 and 2 its mode of operation will now be considered and is as follows. During operation of this thin film apparatus 100 initially the heatable or coolable jacket 13 is heated or cooled, depending upon the processing requirements for the feed stock or material, by means of an appropriate heat exchange medium as is well known in this art. At the same time the rotor or rotor means 22 is placed into rotation by a suitable drive motor 150, and the material to be treated is introduced into the apparatus —it being recalled the same has been assumed to constitute a thin film evaporator — with the aid of the material inlet connection or stud 16. The infed material impinges against the material distributor ring arrangement 30. Now the distributor vanes 46 arranged at the inner housing 32 of the distributor ring arrangement 30 physically act upon the infed material and carry and distribute such over the entire circumference or periphery of the housing 10 within the interior thereof.

The dam-up or baffle ring or ring member 36 as well as the labyrinth seal means 40 prevent penetration of the inflowing material into the annular or ring-shaped compartment 37.

The material distributor ring arrangement or distributor ring means 30 propels the engaged material against the conical inner surface 15a of the transition element 15. The centrifugal forces produced by the vanes 46 counteract the effect of the gravitational forces which would allow such material to flow along the inner surface 15a towards the treatment portion 12. However, the material reaches the effective or operable zone of the conveyor vanes 60 with an already relatively uniform distribution at the circumference or peripheral surface. These conveyor vanes or vane means 60 displace the material into the treatment portion 12 with an additional distribution action. Consequently, the material treatment surface 12c of the treatment compartment 12a is already uniformly covered throughout its entire inner circumference or periphery starting with the uppermost end thereof, in other words with respect to the flow of material right from the start thereof. Hence, the entire treatment surface 12c is beneficially effective for the contemplated treatment operation, that is to say the vaporization or evaporation taking place in the equipment.

The separation of droplets from the vapors formed during the evaporation of the material being processed in the treatment portion 12 and which vapors rise within the apparatus is accomplished by a multiple radial deflection of such vapors at the disks or plates 56 and 58. The droplets which have been separated from the vapors are downwardly guided by means of the downwardly conically widening or enlarging droplet return surface 34 of the inner housing 32. The droplets leave the separator through the gap or space 66 and commingle with the untreated feed or material arriving at the inner surface 15a of the transition member 15.

The vapors departing out of the upper end of the inner housing 32 are deflected in the direction of the vapor outlet or discharge connection 18 where then then leave the thin film apparatus.

The material distributed in the form of a thin film upon the surface of the inner wall 12c of the treatment compartment 12a of the treatment section 12b is partially vaporized, the non-vaporized portion of the material or feed arriving in the form of condensate through the agency of the material outlet or discharge connection 20 at a not particularly illustrated conduit or container, the details of which are of no consequence as concerns the inventive concepts.

Figure 3:
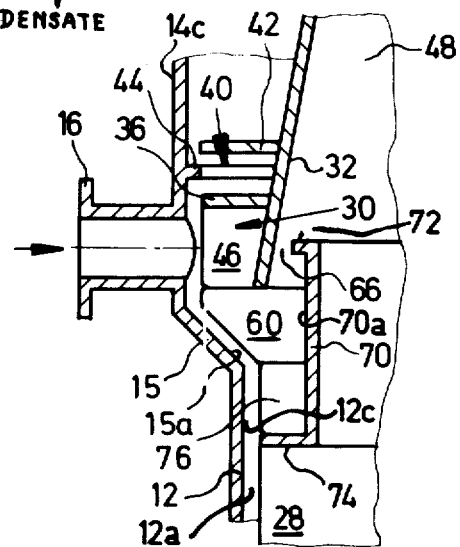
FIG. 3 is a view, corresponding to the showing of FIG. 2, of a second modified version of thin film apparatus.

Now in FIG. 3 there is illustrated a modified construction of material distributor ring arrangement or distributor ring 30 which can be used in the thin film apparatus of FIG. 1. As a matter of convenience it will be recognized that the same reference characters have been generally used in FIG. 3 as employed in FIGS. 1 and 2 for the comparable components, and in the description of FIG. 3 there will only be considered in detail the variant construction constituting this modification. At the lower end of the inner housing 32 there is arranged a substantially cylindrical collar or shroud 70. The diameter of the collar 70 is smaller than that of the inner housing 32 and such collar 70 extends into the confines of the inner housing 32 as shown. The axial ends of this cylindrical collar or shroud 70 are each provided with a material deflection edge 72 and 74, as shown. The conveyor vanes 60 arranged at the lower end of the inner housing 32 extend up to the wall 70a of the collar or shroud 70 and are fixedly connected therewith in any suitable manner. Between the material deflection edge 72 and the inner housing 32 there is again provided a gap or space 66, permitting the throughpassage of the separated-out droplets from the droplet return or recycle surface 34 into the operable zone of the conveyor vanes 60.

Between the free lower ends of the conveyor vanes 60 and the material deflection edge 74 there extend further distributor vanes 76 or equivalent structure which are uniformly spaced or distributed about the circumference or periphery of the cylindrical collar 70. These distributor vanes 76 permit of a fine distribution of the material upon the inner wall 12c of the treatment compartment 12a, this material having been predistributed by the distributor vanes 46 and spread by the conveyor vanes 60 over the surface 15a of the transition member 15.

Although both of the illustrated exemplary embodiments portray separators equipped with ring-shaped or annular deflection disks, it is to be expressly understood that there can be employed in the rotating inner housing also other types of droplet separators, especially those bringing about deflection of the vapors in the circumferential or peripheral direction, for instance, by using a substantially star-shaped arrangement of zig-zag configured separator plates or the like. Equally, other modifications will suggest themselves to those skilled in the art.

While there are shown and described present preferred embodiments of the invention, it is to be distinctly understood that the invention is not limited thereto, but may be otherwise variously embodied and practiced within the scope of the following claims.
ACCORDINGLY,

What is claimed is:

1. A thin film apparatus for the treatment of a flowable material, comprising a substantially rotationally symmetrical housing member, rotor means rotatably mounted in said housing member, said housing member comprising a section defining a treatment portion containing a treatment compartment for the material to be treated and a section comprising a separator portion including a vapor outlet, said separator portion possessing an inner diameter greater than an inner diameter of said treatment portion, a transition member for interconnecting the separator portion with the treatment portion, said transition member possessing a substantially conical inner surface, inlet connection means for the infeed of the material to be treated opening into the interior of the housing member at a region of the substantially conical inner surface of the transition member which possessess a diameter which is larger than an inner diameter of the treatment compartment, said rotor means possessing vanes at least at the region of the treatment portion, said vanes extending approximately in axial direction of the housing member, collar means provided for said rotor means at the region of the substantially conical inner surface of the transition member, said collar means being provided with conveyor elements for displacing the material into the treatment compartment, a rotatable inner housing positioned above the transition member carrying a material distributor ring arrangement including distributor vanes for coaction with said inlet connection means to initially retard the downflow of the infed materials prior to its being downwardly displaced by the conveyor elements on the collar means, said collar means being situated below said distributor ring arrangement and inwardly from the transition member for a distance sufficient to accomodate said conveyor elements.

2. The thin film apparatus as defined in claim 1, wherein said distributor ring arrangement and said separator portion of the housing member are provided with means forming labyrinth seal means.

3. The thin film apparatus as defined in claim 1, wherein said collar member is contiguously situated wih respect to said distributor ring arrangement.

4. The thin film apparatus as defined in claim 1, wherein said conveyor elements comprise material conveying vanes.

5. The thin film apparatus as defined in claim 1, wherein said inner housing is a substantially ring-shaped inner housing rigidly connected for rotation with said rotor means, said distributor ring arrangement being provided at said inner housing, said inner housing being internally provided with separator means.

6. The thin film apparatus as defined in claim 5, wherein said separator means comprise a plurality of separator elements.

7. The thin film apparatus as defined in claim 6, wherein said inner housing includes droplet return surface means for the return of droplets separated out of the material undergoing treatment in the direction of the treatment compartment, said droplet return surface means being positioned for cooperation with said separator elements.

8. The thin film apparatus as defined in claim 7, wherein said inner housing and said collar means are positioned within the housing member relative to one another so as to form gap means between said inner housing and said collar means, said gap means being located substantially at the elevation of the substantially conical inner surface of said transition member.

9. The thin film apparatus as defined in claim 8, wherein said gap means comprises a substantially ring-shaped gap.

10. A thin film apparatus for the treatment of a flowable material, comprising a substantially rotationally symmetrical housing member, rotor means rotatably mounted in said housing member, said housing member comprising a section defining a treatment portion containing a treatment compartment for the material to be treated and a section comprising a separator portion including a vapor outlet, said separator portion possessing an inner diameter greater than an inner diameter of said treatment portion, a transition member for interconnecting the separator portion with the treatment portion, said transition member possessing a substantially conical inner surface, inlet connection means for the infeed of the material to be treated opening into the interior of the housing member at a region of the substantially conical inner surface of the transiton member which possesses a diameter which is larger than an inner diameter of the treatment compartment, said rotor means possessing vanes at least at the region of the treatment portion, said vanes extending approximately in axial direction of the housing member, collar means provided for said rotor means at the region of the substantially conical inner surface of the transition member, said collar means being provided with conveyor elements for displacing the material into the treatment compartment, a material distributor ring arrangement for coaction with said inlet connection means to distribute the infed material, said collar means provided with said conveyor elements being situated adjacent said distributor ring arrangement, said material distributor ring arrangement and said collar means being positioned within the housing member relative to one another so as to form gap means between said inner housing and said collar means, said gap means being located substantially at the elevation of the substantially conical inner surface of said transition member, said gap means comprises a substantially ring-shaped gap.

11. The thin film apparatus as defined in claim 10 wherein said material distribution ring arrangement includes a plurality of vanes.

12. The thin film apparatus as defined in claim 10 hwerein said material distributor ring arrangement is rotatably supported in an inner housing.

13. The thin film apparatus as defined in claim 12, wherein said inner housing is mounted at said rotor means, said inner housing possessing a hollow configuration bounded by wall means forming a droplet return surface for droplets removed from vapors formed during treatment of said material, said material distributor ring arrangement being arranged at least partially to one side of said droplet return surface and said collar means equipped with said conveyor elements being arranged at least partially to the other side of said droplet return surface.

* * * * *